United States Patent
Pearson

(10) Patent No.: US 11,495,999 B2
(45) Date of Patent: Nov. 8, 2022

(54) WIRELESS POWER SUPPLY FOR ELECTRICAL DEVICES

(71) Applicant: Lutron Technology Company LLC, Coopersburg, PA (US)

(72) Inventor: Sean R. Pearson, Allentown, PA (US)

(73) Assignee: Lutron Technology Company LLC, Coopersburg, PA (US)

(*) Notice: Subject to any disclaimer, the term of this patent is extended or adjusted under 35 U.S.C. 154(b) by 0 days.

(21) Appl. No.: 17/080,611

(22) Filed: Oct. 26, 2020

(65) Prior Publication Data

US 2021/0152023 A1    May 20, 2021

Related U.S. Application Data

(63) Continuation of application No. 15/475,991, filed on Mar. 31, 2017, now Pat. No. 10,819,158.

(60) Provisional application No. 62/317,154, filed on Apr. 1, 2016.

(51) Int. Cl.
H02J 50/20    (2016.01)
H02J 50/90    (2016.01)
H02J 50/23    (2016.01)
H02J 50/27    (2016.01)
H02J 7/02     (2016.01)

(52) U.S. Cl.
CPC .............. *H02J 50/20* (2016.02); *H02J 7/025* (2013.01); *H02J 50/23* (2016.02); *H02J 50/27* (2016.02); *H02J 50/90* (2016.02)

(58) Field of Classification Search
CPC ............ H02J 50/20; H02J 7/025; H02J 50/23; H02J 50/27; H02J 50/90; H02J 2310/12
See application file for complete search history.

(56) References Cited

U.S. PATENT DOCUMENTS

| | | |
|---|---|---|
| 5,248,919 A | 9/1993 | Hanna et al. |
| 7,391,297 B2 | 6/2008 | Cash et al. |
| 8,009,042 B2 | 8/2011 | Steiner et al. |
| 8,199,010 B2 | 6/2012 | Sloan et al. |

(Continued)

FOREIGN PATENT DOCUMENTS

WO    WO2016037100 A1    3/2016

*Primary Examiner* — Rexford N Barnie
*Assistant Examiner* — Thai H Tran
(74) *Attorney, Agent, or Firm* — Michael Czarnecki; Glen Farbanish; Philip Smith

(57) ABSTRACT

A wireless power supply system may comprise a wireless power transmitting circuit configured to transmit radio-frequency (RF) signals, and a wireless power receiving circuit configured to convert power from the RF signals into a direct-current (DC) output voltage stored in an energy storage element. The wireless power transmitting circuit may be electrically or magnetically coupled to an antenna and/or electrical wiring of a building for transmitting the RF signals. The wireless power transmitting circuit may be housed in an enclosure that is affixed in a relative location with respect to the wireless power receiving circuit. The antenna may comprise two antenna wires that extend from the enclosure. The wireless power receiving circuit may be electrically or magnetically coupled to an antenna for receiving the RF signals. The wireless power receiving circuit may comprise an RF-to-DC converter circuit for converting the power from the RF signals into a DC output voltage.

21 Claims, 8 Drawing Sheets

(56) References Cited

U.S. PATENT DOCUMENTS

| | | |
|---|---|---|
| 8,228,184 B2 | 7/2012 | Blakeley et al. |
| 8,410,706 B2 | 4/2013 | Steiner et al. |
| 8,451,116 B2 | 5/2013 | Steiner et al. |
| 8,950,461 B2 | 2/2015 | Adams et al. |
| 2004/0108842 A1 | 6/2004 | Oyama et al. |
| 2008/0092075 A1 | 4/2008 | Jacob et al. |
| 2008/0227478 A1 | 9/2008 | Greene et al. |
| 2009/0206983 A1 | 8/2009 | Knode et al. |
| 2009/0278492 A1 | 11/2009 | Shimizu et al. |
| 2011/0112611 A1 | 5/2011 | Aghassian |
| 2011/0127951 A1 | 6/2011 | Walley et al. |
| 2011/0266880 A1* | 11/2011 | Kim ............... H02J 50/50 307/104 |
| 2011/0309688 A1* | 12/2011 | Yamazaki ........ H02J 50/90 307/104 |
| 2012/0112553 A1* | 5/2012 | Stoner, Jr. ....... H02J 50/90 307/104 |
| 2012/0235503 A1 | 9/2012 | Kesler et al. |
| 2013/0030589 A1 | 1/2013 | Pessina et al. |
| 2013/0069585 A1 | 3/2013 | Kamata |
| 2014/0055061 A1* | 2/2014 | Chambers ....... E06B 9/322 318/139 |
| 2014/0132475 A1 | 5/2014 | Bhutani et al. |
| 2014/0145504 A1* | 5/2014 | Kayama ........ H02M 3/156 307/23 |
| 2014/0260459 A1 | 9/2014 | Nguyen et al. |
| 2014/0265568 A1 | 9/2014 | Crafts et al. |
| 2014/0305602 A1 | 10/2014 | Kirby et al. |
| 2014/0312777 A1 | 10/2014 | Shearer et al. |
| 2015/0207542 A1 | 7/2015 | Zeine |
| 2015/0326070 A1* | 11/2015 | Petras ........... H02J 50/20 307/104 |
| 2015/0326142 A1 | 11/2015 | Petras et al. |
| 2016/0056629 A1 | 2/2016 | Baker et al. |
| 2016/0099601 A1* | 4/2016 | Leabman ....... H02J 50/80 307/104 |
| 2016/0099758 A1* | 4/2016 | Bell ............. H02J 7/025 307/104 |
| 2017/0047968 A1* | 2/2017 | Moshfeghi ....... H04B 7/0617 |

* cited by examiner

WIRELESS POWER SUPPLY FOR ELECTRICAL DEVICES

CROSS-REFERENCE TO RELATED APPLICATIONS

This application is a continuation of U.S. patent application Ser. No. 15/475,991, filed on Mar. 31, 2017, which claims priority to U.S. Provisional Patent Application Ser. No. 62/317,154, filed on Apr. 1, 2016, the entire disclosures of which are hereby incorporated by reference.

BACKGROUND

A user environment, such as a residence or an office building for example, may be configured using various types of load control systems. A lighting control system may be used to control the lighting loads in the user environment. A motorized window treatment control system may be used to control the natural light provided to the user environment. An HVAC system may be used to control the temperature in the user environment. Each load control system may include various control devices, including control-source devices and control-target devices. The control-target devices may receive digital messages, which may include load control instructions, for controlling an electrical load from one or more of the control-source devices. The control-target devices may be capable of directly controlling an electrical load. The control-source devices may be capable of indirectly controlling the electrical load via the control-target device. Examples of control-target devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of control-source devices may include remote control devices, occupancy sensors, daylight sensors, temperature sensors, and/or the like.

Battery powered control devices may greatly simplify the installation process in retrofit applications by removing the need for electrical wiring. However, replacing batteries in control devices may be an annoyance to a user, and therefore, methods to reduce or eliminate battery replacement is highly desirable.

SUMMARY

The present disclosure relates to a power supply for an electrical device, and more particularly, to a wireless power supply for wirelessly supplying power to one or more control devices of a load control system.

As described herein, a wireless power supply system may comprise a wireless power transmitting circuit configured to transmit RF signals, and a wireless power receiving circuit configured to convert power from the RF signals into a direct-current (DC) output voltage stored in an energy storage element (e.g., a storage capacitor or a battery). The wireless power transmitting circuit may be electrically or magnetically coupled to an antenna and/or to electrical wiring of a building for transmitting the RF signals to the wireless power receiving circuit. The wireless power transmitting circuit may be housed in an enclosure and the antenna may comprise at least two antenna wires that are electrically or magnetically coupled to the wireless power transmitting circuit and, for example, may extend from the enclosure (e.g., to form a dipole antenna). Alternatively or additionally, the wireless power transmitting circuit may use existing power wiring to radiate power. The enclosure may be configured to be affixed in a relative location with respect to the wireless power receiving circuit, for example, at least two feet apart from the wireless power receiving circuit. The wireless power receiving circuit may be electrically or magnetically coupled to an antenna for receiving the RF signals transmitted by the wireless power transmitting circuit. The antenna may comprise at least two antenna wires coupled to the wireless power receiving circuit (e.g., to form a dipole antenna). The wireless power receiving circuit may comprise an RF-to-DC converter circuit coupled to the antenna for converting the power from the RF signals into a DC output voltage.

In addition, a control device having a wireless power receiving circuit is also described herein. The wireless power receiving circuit may convert power from RF signals received by an antenna into a direct-current (DC) output voltage stored in an energy storage element. The control device may also comprise a regulated power supply configured to generate a DC supply voltage from the DC output voltage generated by the wireless power receiving circuit, a control circuit configured to be powered by the DC supply voltage, and a wireless communication circuit coupled to the control circuit and configured to transmit wireless signals. The control circuit may be configured to be powered exclusively by the DC supply voltage.

As also described herein, a motor drive unit for a motorized window treatment may be configured to drive a motor of the motorized window treatment and may comprise a wireless power receiving circuit. The wireless power receiving circuit may convert power from RF signals received by an antenna into a direct-current (DC) output voltage stored in an energy storage element. The motor drive unit may further comprise a regulated power supply, a boost converter, a drive circuit, and a control circuit. The regulated power supply may generate a DC supply voltage from the DC output voltage generated by the wireless power receiving circuit. The boost converter may generate a boosted voltage from the DC supply voltage, where the boosted voltage has a magnitude greater than a magnitude of the DC supply voltage. The drive circuit may control the amount of power delivered to the motor. The drive circuit may be coupled to the boosted voltage for drawing current from the boosted voltage when the drive circuit is delivering power to the motor. The control circuit may be configured to be powered by the DC supply voltage and may be configured to generate a drive signal for controlling the drive circuit to adjust the amount of power delivered to the motor.

DETAILED DESCRIPTION

Figure 1A:
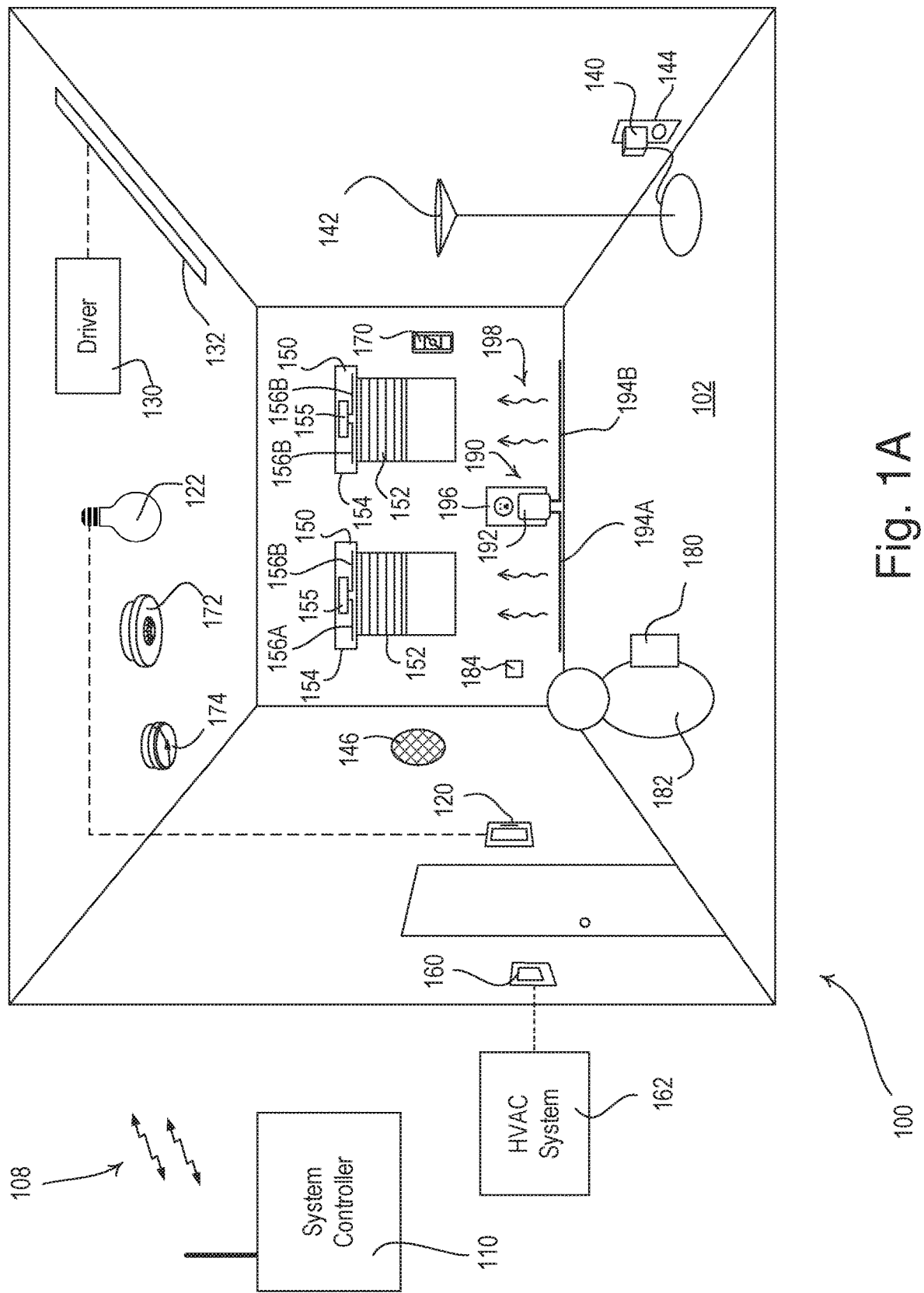
FIGS. 1A and 1B each show a simple diagram of an example load control system having a wireless power supply for one or more control devices of the load control system.

FIG. 1A is a simple diagram of an example load control system 100 for controlling the amount of power delivered from an alternating-current (AC) power source (not shown) to one or more electrical loads. The load control system 100 may be installed in a room 102 of a building. The load control system 100 may comprise a plurality of control devices configured to communicate with each other via wireless signals, e.g., radio-frequency (RF) signals 108. Alternatively or additionally, the load control system 100 may comprise a wired digital communication link coupled to one or more of the control devices to provide for communication between the load control devices. The control devices of the load control system 100 may comprise a number of control-source devices (e.g., input devices operable to transmit digital messages in response to user inputs, occupancy/vacancy conditions, changes in measured light intensity, etc.) and a number of control-target devices (e.g., load control devices operable to receive digital messages and control respective electrical loads in response to the received digital messages). A single control device of the load control system 100 may operate as both a control-source and a control-target device.

The control-source devices may be configured to transmit digital messages directly to the control-target devices. In addition, the load control system 100 may comprise a system controller 110 (e.g., a central processor or load controller) operable to communicate digital messages to and from the control devices (e.g., the control-source devices and/or the control-target devices). For example, the system controller 110 may be configured to receive digital messages from the control-source devices and transmit digital messages to the control-target devices in response to the digital messages received from the control-source devices. The control-source and control-target devices and the system controller 110 may be configured to transmit and receive the RF signals 108 using a proprietary RF protocol, such as the ClearConnect® protocol. Alternatively, the RF signals 108 may be transmitted using a different RF protocol, such as, a standard protocol, for example, one of WIFI, ZIGBEE, Z-WAVE, KNX-RF, ENOCEAN RADIO protocols, or a different proprietary protocol.

The load control system 100 may comprise one or more load control devices, e.g., a dimmer switch 120 for controlling a lighting load 122. The dimmer switch 120 may be adapted to be wall-mounted in a standard electrical wallbox. The dimmer switch 120 may comprise a tabletop or plug-in load control device. The dimmer switch 120 may comprise a toggle actuator (e.g., a button) and an intensity adjustment actuator (e.g., a rocker switch). Actuations (e.g., successive actuations) of the toggle actuator may toggle (e.g., turn off and on) the lighting load 122. Actuations of an upper portion or a lower portion of the intensity adjustment actuator may respectively increase or decrease the amount of power delivered to the lighting load 122 and thus increase or decrease the intensity of the receptive lighting load from a minimum intensity (e.g., approximately 1%) to a maximum intensity (e.g., approximately 100%). The dimmer switch 120 may comprise a plurality of visual indicators, e.g., light-emitting diodes (LEDs), which are arranged in a linear array and are illuminated to provide feedback of the intensity of the lighting load 122. Examples of wall-mounted dimmer switches are described in greater detail in U.S. Pat. No. 5,248,919, issued Sep. 29, 1993, entitled LIGHTING CONTROL DEVICE, and U.S. Patent Application Publication No. 2014/0132475, published May 15, 2014, entitled WIRELESS LOAD CONTROL DEVICE, the entire disclosures of which are hereby incorporated by reference.

The dimmer switch 120 may be configured to wirelessly receive digital messages via the RF signals 108 (e.g., from the system controller 110, from a control-source devices, etc.) and to control the lighting load 122 in response to the received digital messages. Examples of dimmer switches operable to transmit and receive digital messages is described in greater detail in commonly-assigned U.S. patent application Ser. No. 12/033,223, filed Feb. 19, 2008, entitled COMMUNICATION PROTOCOL FOR A RADIO-FREQUENCY LOAD CONTROL SYSTEM, the entire disclosure of which is hereby incorporated by reference.

The load control system 100 may comprise one or more remotely-located load control devices, such as a light-emitting diode (LED) driver 130 for driving an LED light source 132 (e.g., an LED light engine). The LED driver 130 may be located remotely, for example, in or adjacent to the lighting fixture of the LED light source 132. The LED driver 130 may be configured to receive digital messages via the RF signals 108 (e.g., from the system controller 110) and to control the LED light source 132 in response to the received digital messages. The LED driver 130 may be configured to adjust the color (e.g., color temperature) of the LED light source 132 in response to the received digital messages. Examples of LED drivers configured to control the color temperature of LED light sources are described in greater detail in commonly-assigned U.S. Patent Application Publication No. 2014/0312777, filed Oct. 23, 2014, entitled SYSTEMS AND METHODS FOR CONTROLLING COLOR TEMPERATURE, the entire disclosure of which is hereby incorporated by reference. The load control system 100 may further comprise other types of remotely-located load control devices, such as, for example, electronic dimming ballasts for driving fluorescent lamps.

The load control system 100 may comprise a plug-in load control device 140 for controlling a plug-in electrical load, e.g., a plug-in lighting load (e.g., such as a floor lamp 142 or a table lamp) and/or an appliance (e.g., such as a television or a computer monitor). For example, the floor lamp 142 may be plugged into the plug-in load control device 140. The plug-in load control device 140 may be plugged into a standard electrical outlet 144 and thus may be coupled in series between the AC power source and the plug-in lighting load. The plug-in load control device 140 may be configured to receive digital messages via the RF signals 108 (e.g., from the system controller 110) and to turn on and off or adjust the intensity of the floor lamp 142 in response to the received digital messages.

Alternatively or additionally, the load control system 100 may comprise controllable receptacles for controlling plug-in electrical loads plugged into the receptacles. The load control system 100 may comprise one or more load control devices or appliances that are able to directly receive the wireless signals 108 from the system controller 110, such as a speaker 146 (e.g., part of an audio/visual or intercom system), which is able to generate audible sounds, such as alarms, music, intercom functionality, etc.

The load control system 100 may comprise one or more daylight control devices, e.g., motorized window treatments 150, such as motorized cellular shades, for controlling the amount of daylight entering the room 102. Each motorized window treatments 150 may comprise a window treatment fabric 152 hanging from a headrail 154 in front of a respective window. Each motorized window treatment 150 may further comprise a motor drive unit 155 located inside of the headrail 154 for raising and lowering the window treatment fabric 152 for controlling the amount of daylight entering the room 102. The motor drive units 155 of the motorized window treatments 150 may be configured to receive digital messages via the RF signals 108 (e.g., from the system controller 110) and adjust the position of the respective window treatment fabric 152 in response to the received digital messages. The motor drive unit 155 of each motorized window treatment 150 may be battery powered or may be coupled to an external AC or DC power source. The load control system 100 may comprise other types of daylight control devices, such as, for example, a cellular shade, a drapery, a Roman shade, a Venetian blind, a Persian blind, a pleated blind, a tensioned roller shade system, an electrochromic or smart window, and/or other suitable daylight control devices. Examples of battery-powered motorized window treatments are described in greater detail in U.S. Pat. No. 8,950,461, issued Feb. 10, 2015, entitled MOTORIZED WINDOW TREATMENT, and U.S. Patent Application Publication No. 2014/0305602, published Oct. 16, 2014, entitled INTEGRATED ACCESSIBLE BATTERY COMPARTMENT FOR MOTORIZED WINDOW TREATMENT, the entire disclosures of which are hereby incorporated by reference.

The load control system 100 may comprise one or more temperature control devices, e.g., a thermostat 160 for controlling a room temperature in the room 102. The thermostat 160 may be coupled to a heating, ventilation, and air conditioning (HVAC) system 162 via a control link (e.g., an analog control link or a wired digital communication link). The thermostat 160 may be configured to wirelessly communicate digital messages with a controller of the HVAC system 162. The thermostat 160 may comprise a temperature sensor for measuring the room temperature of the room 102 and may control the HVAC system 162 to adjust the temperature in the room to a setpoint temperature. The load control system 100 may comprise one or more wireless temperature sensors (not shown) located in the room 102 for measuring the room temperatures. The HVAC system 162 may be configured to turn a compressor on and off for cooling the room 102 and to turn a heating source on and off for heating the rooms in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the room 102.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

The load control system 100 may comprise one or more input devices, e.g., such as a remote control device 170, an occupancy sensor 172, and/or a daylight sensor 174. The input devices may be fixed or movable input devices. The remote control device 170, the occupancy sensor 172, and/or the daylight sensor 174 may be wireless control devices (e.g., RF transmitters) configured to transmit digital messages via the RF signals 108 to the system controller 110 (e.g., directly to the system controller). The system controller 110 may be configured to transmit one or more digital messages to the load control devices (e.g., the dimmer switch 120, the LED driver 130, the plug-in load control device 140, the motorized window treatments 150, and/or the thermostat 160) in response to the digital messages received from the remote control device 170, the occupancy sensor 172, and/or the daylight sensor 174. The remote control device 170, the occupancy sensor 172, and/or the daylight sensor 174 may be configured to transmit digital messages directly to the dimmer switch 120, the LED driver 130, the plug-in load control device 140, the motorized window treatments 150, and the temperature control device 160.

The remote control device 170 may be configured to transmit digital messages to the system controller 110 via the RF signals 108 in response to an actuation of one or more buttons of the remote control device. For example, the remote control device 170 may be battery-powered. The remote control device 170 may be handheld, mounted on a wall, affixed to a table top mount, and/or the like.

The occupancy sensor 172 may be configured to detect occupancy and vacancy conditions in the room 102 (e.g., the room in which the occupancy sensors are mounted). For example, the occupancy sensor 172 may be battery-powered. The occupancy sensor 172 may transmit digital messages to the system controller 110 via the RF signals 108 in response to detecting the occupancy or vacancy conditions. The system controller 110 may be configured to turn the lighting loads (e.g., lighting load 122 and/or the LED light source 132) on and off in response to receiving an occupied command and a vacant command, respectively. The occupancy sensor 172 may operate as a vacancy sensor, such that the lighting loads are only turned off in response to detecting a vacancy condition (e.g., and not turned on in response to detecting an occupancy condition). Examples of RF load control systems having occupancy and vacancy sensors are described in greater detail in commonly-assigned U.S. Pat. No. 8,009,042, issued Aug. 30, 2011 Sep. 3, 2008, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 174 may be configured to measure a total light intensity in the room 102 (e.g., the room in which the daylight sensor is installed). For example, the daylight sensor 174 may be battery-powered. The daylight sensor 174 may transmit digital messages (e.g., including the measured light intensity) to the system controller 110 via the RF signals 108 for controlling the intensities of the lighting load 122 and/or the LED light source 132 in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The system controller 110 may be configured to be coupled to a network, such as a wireless or wired local area network (LAN), e.g., for access to the Internet. The system controller 110 may be wirelessly connected to the network, e.g., using Wi-Fi technology. The system controller 110 may be coupled to the network via a network communication bus (e.g., an Ethernet communication link).

The system controller 110 may be configured to communicate via the network with one or more network devices, e.g., a mobile device 180, such as, a personal computing device and/or a wearable wireless device. The mobile device 180 may be located on an occupant 182, for example, may be attached to the occupant's body or clothing or may be held by the occupant. The mobile device 180 may be characterized by a unique identifier (e.g., a serial number or address stored in memory) that uniquely identifies the mobile device 180 and thus the occupant 182. Examples of personal computing devices may include a smart phone (for example, an iPhone® smart phone, an Android® smart phone, or a Blackberry® smart phone), a laptop, and/or a tablet device (for example, an iPad® hand-held computing device). Examples of wearable wireless devices may include an activity tracking device (such as a FitBit® device, a Misfit® device, and/or a Sony Smartband® device), a smart watch, smart clothing (e.g., OMsignal® smartwear, etc.), and/or smart glasses (such as Google Glass® eyewear). In addition, the system controller 110 may be configured to communicate via the network with one or more other control systems (e.g., a building management system, a security system, etc.).

The mobile device 180 may be configured to transmit digital messages to the system controller 110, for example, in one or more Internet Protocol packets. For example, the mobile device 180 may be configured to transmit digital messages to the system controller 110 over the LAN and/or via the internet. The mobile device 180 may be configured to transmit digital messages over the internet to an external service (e.g., If This Then That (IFTTT®) service), and then the digital messages may be received by the system controller 110. The mobile device 180 may transmit the RF signals 108 via a Wi-Fi communication link, a Wi-MAX communications link, a Bluetooth communications link, a near field communication (NFC) link, a cellular communications link, a television white space (TVWS) communication link, or any combination thereof. Alternatively or additionally, the mobile device 180 may be configured to transmit RF signals according to the proprietary protocol.

The load control system 100 may comprise other types of network devices coupled to the network, such as a desktop personal computer, a Wi-Fi or wireless-communication-capable television, or any other suitable Internet-Protocol-enabled device. Examples of load control systems operable to communicate with mobile and/or network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The operation of the load control system 100 may be programmed and configured using, for example, the mobile device 180 or other network device (e.g., when the mobile device is a personal computing device). The mobile device 180 may execute a graphical user interface (GUI) configuration software for allowing a user to program how the load control system 100 will operate. For example, the configuration software may run as a PC application or a web interface. The configuration software and/or the system controller 110 (e.g., via instructions from the configuration software) may generate a load control database that defines the operation of the load control system 100. For example, the load control database may include information regarding the operational settings of different load control devices of the load control system (e.g., the dimmer switch 120, the LED driver 130, the plug-in load control device 140, the motorized window treatments 150, and/or the thermostat 160). The load control database may comprise information regarding associations between the load control devices and the input devices (e.g., the remote control device 170, the occupancy sensor 172, and/or the daylight sensor 174). The load control database may comprise information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. patent application Ser. No. 13/830,237, filed Mar. 14, 2013, entitled COMMISSIONING LOAD CONTROL SYSTEMS, the entire disclosure of which is hereby incorporated by reference.

The system controller 110 may be configured to determine the location of the mobile device 180 and/or the occupant 182. The system controller 110 may be configured to control (e.g., automatically control) the load control devices (e.g., the dimmer switch 120, the LED driver 130, the plug-in load control device 140, the motorized window treatments 150, and/or the temperature control device 160) in response to determining the location of the mobile device 180 and/or the occupant 182. The system controller 110 may be configured to control the load control devices according to occupant control parameters associated with the occupant 182. The occupant control parameters may be predetermined or preset settings for the occupant 182, biometric data for the occupant, and/or user input data received from the user via the mobile device 180.

One or more of the control devices of the load control system 100 may transmit beacon signals, for example, RF beacon signals transmitted using a short-range and/or low-power RF technology, such as Bluetooth technology. The load control system 100 may comprise at least one beacon transmitting device 184 for transmitting the beacon signals. The beacon transmitting devices 184 may be battery-powered (e.g., including a battery for powering the beacon transmitting device). The beacon transmitting device 184 may also be plugged into a receptacle to receive AC power and/or may be connected to an external power supply for receiving DC power. Any fixed-location control device of the load control system 100 (e.g., any of the load control devices, such as the dimmer switch 120, the LED driver 130, the motorized window treatments 150, and/or the temperature control device 160) may be also be configured to transmit the beacon signals (e.g., to operate beacon transmitting devices).

The mobile device 180 may be configured to receive a beacon signal when located near a control device that is presently transmitting the beacon signal. A beacon signal may comprise a unique identifier identifying the location of the load control device that transmitted the beacon signal. Since the beacon signal may be transmitted using a short-range and/or low-power technology, the unique identifier may indicate the approximate location of the mobile device 180. The mobile device 180 may be configured to transmit the unique identifier to the system controller 110, which may be configured to determine the location of the mobile device 180 using the unique identifier (e.g., using data stored in memory or retrieved via the Internet). The system controller 110 may be configured to transmit control data (e.g., the determined location and/or names of an area, groups, zones, electrical loads, control devices, load control devices, input devices, presets, and/or scenes associated with the location) back to the mobile device 180 and/or control (e.g., automatically control) the load control devices in response to the location of the mobile device.

The system controller 110 may be configured to determine the location of the mobile device 180 using triangulation. Since the load control devices of the load control system 100 may be mounted in fixed locations, the load control devices may measure the signal strength of RF signals received from the mobile device 180. The load control devices may transmit these signals strengths to the system controller 110, which may be configured to determine the location of the mobile device using the signal strengths. One or more load control devices of the load control system 100 may be movable devices. As such, the load control system 100 may comprise fixed and movable load control devices. An example of a load control system for controlling one or more electrical loads in response to the position of a mobile device and/or occupant inside of a building is described in greater detail in commonly-assigned U.S. patent application Ser. No. 14/832,798, filed Aug. 21, 2015, entitled LOAD CONTROL SYSTEM RESPONSIVE TO LOCATION OF AN OCCUPANT AND MOBILE DEVICES, the entire disclosure of which is hereby incorporated by reference.

The load control system 100 may comprise a wireless power supply for powering one or more of the control devices in the room 102. The wireless power supply may comprise a wireless power transmitting module 190 configured to wirelessly transmit power to wireless power receiving circuits inside of one or more of the control devices in the room. The wireless power receiving circuits may be configured to harvest (e.g., obtain or capture) energy from RF signals 198 transmitted by the wireless power transmitting module 190.

The wireless power transmitting module 190 may comprise a wireless power transmitting circuit (not shown) housed within an enclosure 192. The wireless power transmitting module 190 may include an antenna (e.g., a dipole antenna), which for example, may include two transmitting antenna wires 194A, 194B that extend from the enclosure 192 and that are coupled (e.g., electrically or magnetically coupled) to the wireless power transmitting circuit. The antenna may also be formed as a loop or helical antenna. The wireless power transmitting module 190 may comprise electrical prongs (not shown) that may be plugged into a standard electrical outlet 196 for powering the wireless power transmitting circuit from an AC power source. In some examples, the transmitting antenna wires 194A, 194B may be positioned horizontally to extend in opposite directions, for example, along the floor at the bottom of the wall below the motorized window treatments 150 as shown in FIG. 1A.

The wireless power transmitting module 190 may, for example, be configured to continuously transmit power to the wireless power receiving circuits of the control devices. Alternatively or additionally, the wireless power transmitting module 190 may be configured to transmit power in a periodic (e.g., a pulsed or pulse-width modulated) manner, for example, in bursts having a higher peak power for a shorter duration. If power is transmitted in a periodic matter, the frequency of the pulses can be adjusted with respect to time (e.g., swept), such that there is no specific channel (e.g., frequency) with which the wireless power supply transmitting module 190 is constantly interfering.

The wireless power transmitting module 190 may power one or more control devices, or may supplement the power supply of one or more control devices, for example, any of the control devices described herein. The wireless power transmitting module 190 (e.g., the enclosure that includes the wireless power transmitting module 190) may be configured to be affixed (e.g., permanently affixed) in a relative location in the room 102 with respect to one or more of the control devices. For example, the wireless power transmitting module 190 may be configured to be affixed at least two feet away from a control device. The control device may also be configured to be affixed (e.g., permanently affixed) in a location in the room 102. In that regard, the wireless power transmitting module 190 and the control devices may be configured to be affixed in relative locations during operation of the control devices.

The control devices that harvest power from the wireless power transmitting module may include an antenna and an internal wireless power receiving circuit. The antenna of the control device may be configured to be substantially parallel with the antenna of the wireless power transmitting module 190. For example, the motor drive units 155 of the motorized window treatments 150 may each comprise an internal wireless power receiving circuit that allows for powering a motor, an internal control circuit, and/or an internal wireless communication circuit (e.g., an RF transceiver) of the motor drive unit. The motor drive units 155 may each comprise an antenna (e.g., a dipole antenna) having two antenna wires 156A, 156B that extend from the motor drive unit 155 and are electrically coupled to the internal wireless power receiving circuit. The antenna may also be formed as a loop or helical antenna. The motor drive units 115 may also comprise a backup battery in case the wireless power receiving circuit is not able to supply power to the motor, the internal control circuit, and/or the internal wireless communication circuit.

The federal communications commission (FCC) sets and maintains restrictions and regulations on wireless transmissions according to specific frequency bands. For wireless power transmission, a frequency band may be selected that allows sufficient power to be transmitted while reducing losses. For example, higher frequencies have greater losses and require the transmitting and receiving antennas to be physically closer. In some examples, the wireless power transmitting module 190 may transmit the RF signals 198 in an AM radio band (e.g., as defined by FCC 15.219) in the RF frequency range of approximately 580-1700 kHz. This AM radio band allows a transmission power of up to 100 mW (20 dBm) if the antenna of the wireless power transmitting module 190 is less than three meters in length. For example, the transmitting antenna wires 194A, 194B may have a total length of approximately 45 inches (e.g., 0.005 times the wavelength k, or about 1.14 meters) at a transmission frequency $f_{TX}$ of 1295 kHz. The theoretical maximum gain for an antenna having dimensions equal to 0.005λ is about −35 dBm.

Friis formula is typically used in the art to calculate received power from the transmitting antenna at the receiving antenna. According to Friis formula (Equation 1), $$P_{RX}=P_{IN}+G_T+G_R+PL \quad [1]$$

where $P_{RX}$ is the power received at the receiving antenna, $P_{IN}$ is the input power into the transmitting antenna, $G_T$ is the gain of the transmitting antenna, $G_R$ is the gain of the receiving antenna, and PL is the path loss. For similar receiving and transmitting antennas, the performance may be assumed to be similar (i.e., $G_T=G_R$). The path loss in the far field ($PL_{FF}$) may be calculated, for example, according to Equation 2 below:

$$PL_{FF}=10\ log_{10}[0.25(\lambda/2\pi R)^2] \quad [2]$$

where R is the distance between the transmitting and receiving antennas.

However, when the distance from the transmission antenna is in the near field (i.e., for ranges of less than 0.1λ), this path loss calculation becomes inaccurate. In some instances, for example where the wireless power transmitting module provides power to the motorized window treatment, the distance between the transmitting antenna of the wireless power transmitting module, which is plugged into an electrical outlet, and the receiving antenna in the motor drive unit in the headrail of the motorized window treatment, may be less than or equal to approximately 7.6 feet (e.g., 0.01 times the wavelength λ at the transmission frequency $f_{TX}$ of 1295 kHz). This distance is within the near field; therefore, to more accurately calculate path loss, the equation must be adapted for near field calculations, according to the modified path loss equation for near field ($PL_{NF}$), for example, as described in Equation 3:

$$PL_{NF}=10\ log_{10}[0.25(\lambda/2\pi R)^2-(\lambda/2\pi R)^4+(\lambda/2\pi R)^6] \quad [3]$$

Using equations [1] and [3], for a path length of 7.6 feet and a transmission frequency of 1295 kHz, the path loss can be approximated to 66 dBm. Therefore, the power at the receiving antenna can then be estimated by:

$$P_{RX}=20\ dBm+(-35\ dB)+(-35\ dB)+66=16\ dBm$$

Therefore, the received power is approximately 16 dBm, or 40 mW.

Although the frequency described here is 1295 kHz, the wireless power supply transmitting module 190 is not limited to this frequency, nor the frequency band specified in FCC 15.219. For instance, in some examples, the wireless power transmitting module 190 may transmit the RF signals 198 at a different frequency, for example, at 2.4 GHz. The antenna(s) of the wireless power transmitting module 190 transmitting at a higher frequency, such as 2.4 GHz, may be shorter than the antenna(s) transmitting at 1295 kHz. The antenna(s) of the wireless power supply transmitting module 190 transmitting at 2.4 GHz may be contained within the enclosure 192 and the wireless power transmitting module 190 may not require the antenna wires 194A, 194B that extend from the enclosure 192. Due to a smaller antenna size at 2.4 GHz, the antennas of the transmitter and/or the receiver may be an antenna array or a cascade of multiple antenna elements with outputs in parallel, (i.e., contain multiple antennas). For example, the receiving antenna array may be a directional array, such as a Yagi antenna array.

Other control devices of the load control system 100, such as, for example, the remote control device 170, the occupancy sensor 172, the daylight sensor 174, and/or the beacon transmitting device 184, may also comprise wireless power receiving circuits for harvesting energy from the RF signals 198 transmitted by the wireless power transmitting module 190.

Figure 1B:
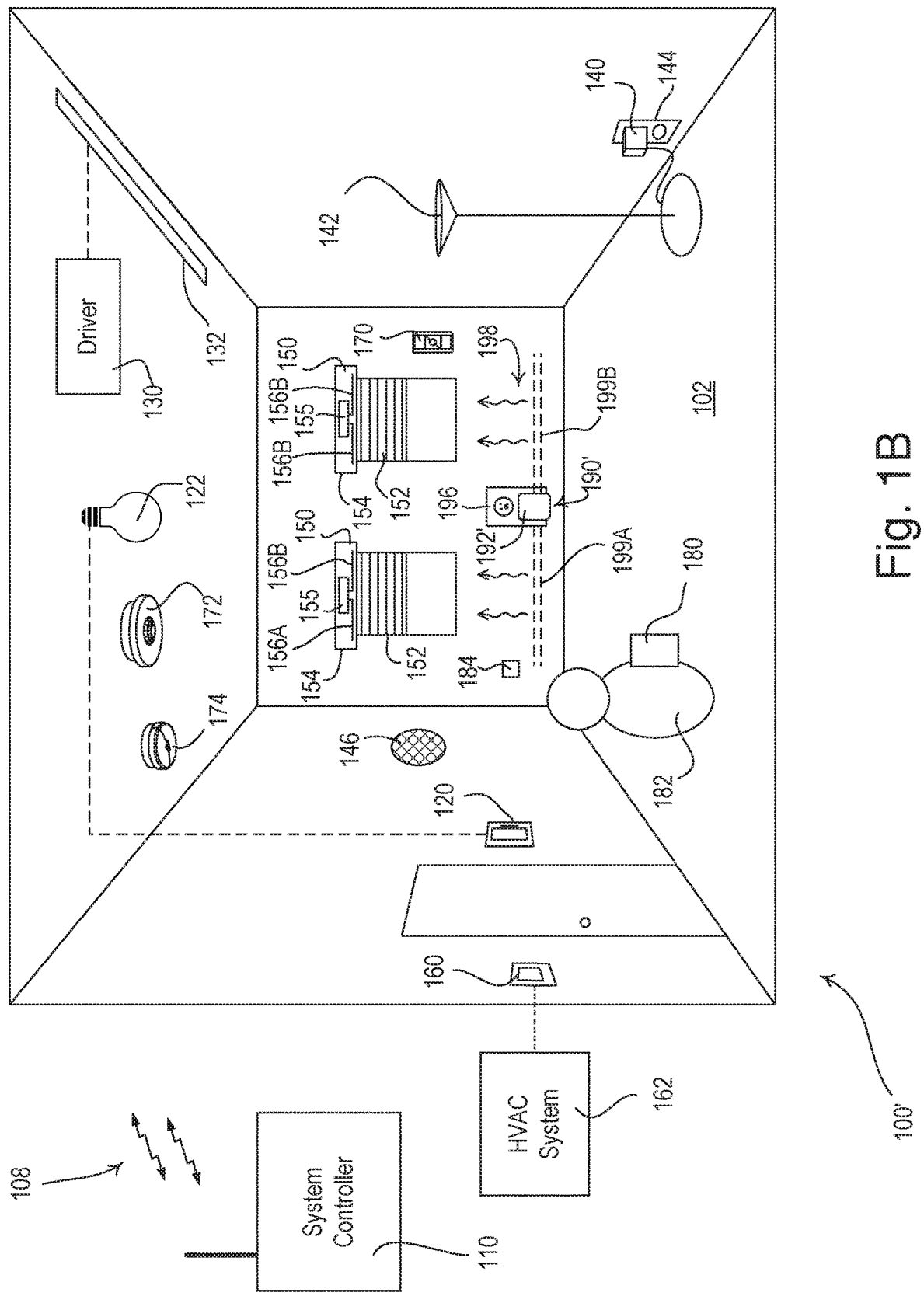

FIG. 1B is a simple diagram of another example load control system 100' for controlling the amount of power delivered from an alternating-current (AC) power source (not shown) to one or more electrical loads. The load control system 100' shown in FIG. 1B is very similar to the load control system 100 shown in FIG. 1A and has many similar control devices. The load control system 100' may comprise a wireless power supply for powering one or more of the control devices in the load control system. The wireless power supply may comprise a wireless power transmitting module 190' configured to wirelessly transmit power to wireless power receiving circuits inside of one or more of the control devices in the room. The wireless power receiving circuits may be configured to harvest energy from RF signals 198 transmitted by the wireless power transmitting module 190'.

The wireless power transmitting module 190' may comprise a wireless power transmitting circuit (not shown) housed within an enclosure 192'. To power the wireless power transmitting circuit, the wireless power transmitting module 190' may comprise electrical prongs (not shown) that may be plugged into the electrical outlet 196, which may be electrically coupled to an AC power source via electrical wires (shown by 199A, 199B in FIG. 1B). Rather than including an antenna (e.g., as with the wireless power transmitting module 190 of FIG. 1A), the wireless power transmitting circuit of the wireless power transmitting module 190' of FIG. 1B may be coupled (e.g., electrically or magnetically coupled) to the electrical wires 199A, 199B (e.g., to the hot connection) via one or more of the electrical prongs for radiating the RF signals 198 (e.g., to form a carrier current transmission system) via the electrical wires 199A, 199B. For example, the wireless power transmitting module 190' may be configured to continuously transmit power to the wireless power receiving circuits of the control devices. Further, the wireless power transmitting module 190' may be configured to transmit power in a periodic (e.g., a pulsed or pulse-width modulated) manner, for example, in bursts having a higher peak power for a shorter duration. If power is transmitted in a periodic matter, the frequency of the pulses can be adjusted with respect to time (e.g., swept), such that there is no specific channel (e.g., frequency) with which the wireless power transmitting module 190' is constantly interfering.

Figure 2A:
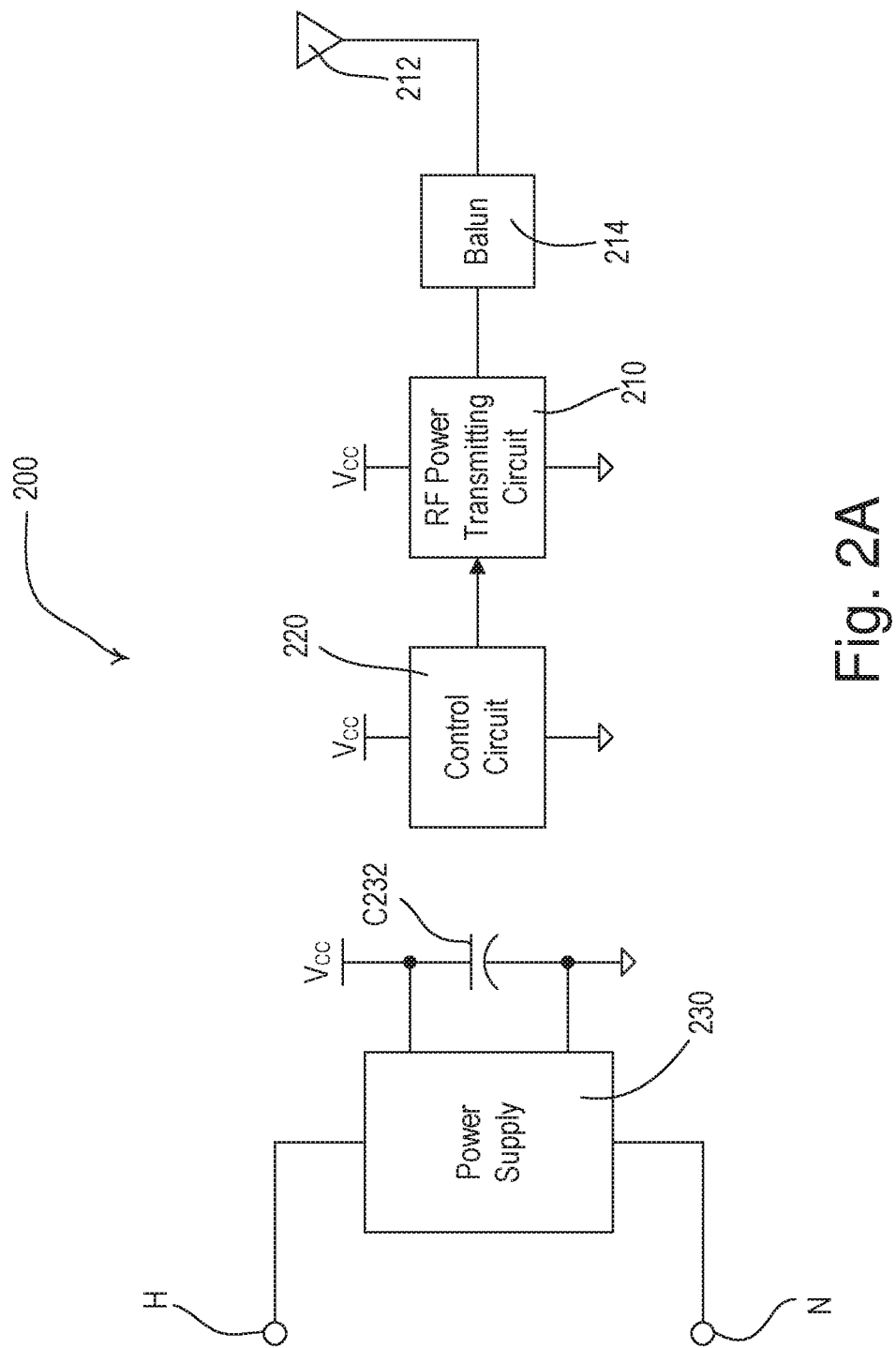
FIGS. 2A and 2B each show a simplified block diagram of an example wireless power transmitting module.

FIG. 2A is a simplified block diagram of an example wireless power transmitting module 200, which may be deployed as, for example, the wireless power transmitting module 190 of the wireless power supply shown in FIG. 1A. The wireless power transmitting module 200 may comprise a wireless power transmitting circuit 210 coupled to an antenna 212, e.g., an electric field (E-field) antenna, through a balun circuit 214. For example, the antenna 212 may comprise a dipole antenna (e.g., having the antenna wires 194A, 194B as shown in FIG. 1A). The antenna 212 may also be formed as a loop or helical antenna. The wireless power transmitting circuit 210 may be configured to wirelessly transmit power to, for example, wireless power receiving circuits inside of one or more of the control devices of a load control system (e.g., the control devices of the load control system 100 shown in FIG. 1A).

The wireless power transmitting module 200 may comprise a control circuit 220 (e.g., a digital control circuit) for controlling the operation of the wireless power transmitting circuit 210. The control circuit 220 may comprise, for example, a microprocessor, a programmable logic device (PLD), a microcontroller, an application specific integrated circuit (ASIC), a field-programmable gate array (FPGA), or any suitable processing device or control circuit. For example, the control circuit 220 may be configured to control the wireless power transmitting circuit 210 to cause the wireless power transmitting circuit 210 to transmit (e.g., continuously transmit) power to the wireless power receiving circuits of the control devices. Further, the control circuit 220 may be configured to pulse-width modulate the operation of the wireless power transmitting circuit 210 to cause the wireless power transmitting circuit 210 to transmit power in a periodic (e.g., a pulsed or pulse-width modulated) manner, for example, in bursts having a higher peak power for a shorter duration.

The wireless power transmitting module 200 may comprise a power supply 230 for generating a DC supply voltage $V_{CC}$ (e.g., having a nominal magnitude of approximately 3.3 V) for powering the wireless power transmitting circuit 210 and the control circuit 220. The DC supply voltage $V_{CC}$ may be generated across a storage capacitor C232. The power supply 230 may be electrically coupled to a hot terminal H and a neutral terminal N to receiver power from an AC power source (e.g., via the electrical prongs of the wireless power transmitting module 190 shown in FIG. 1A).

Figure 2B:
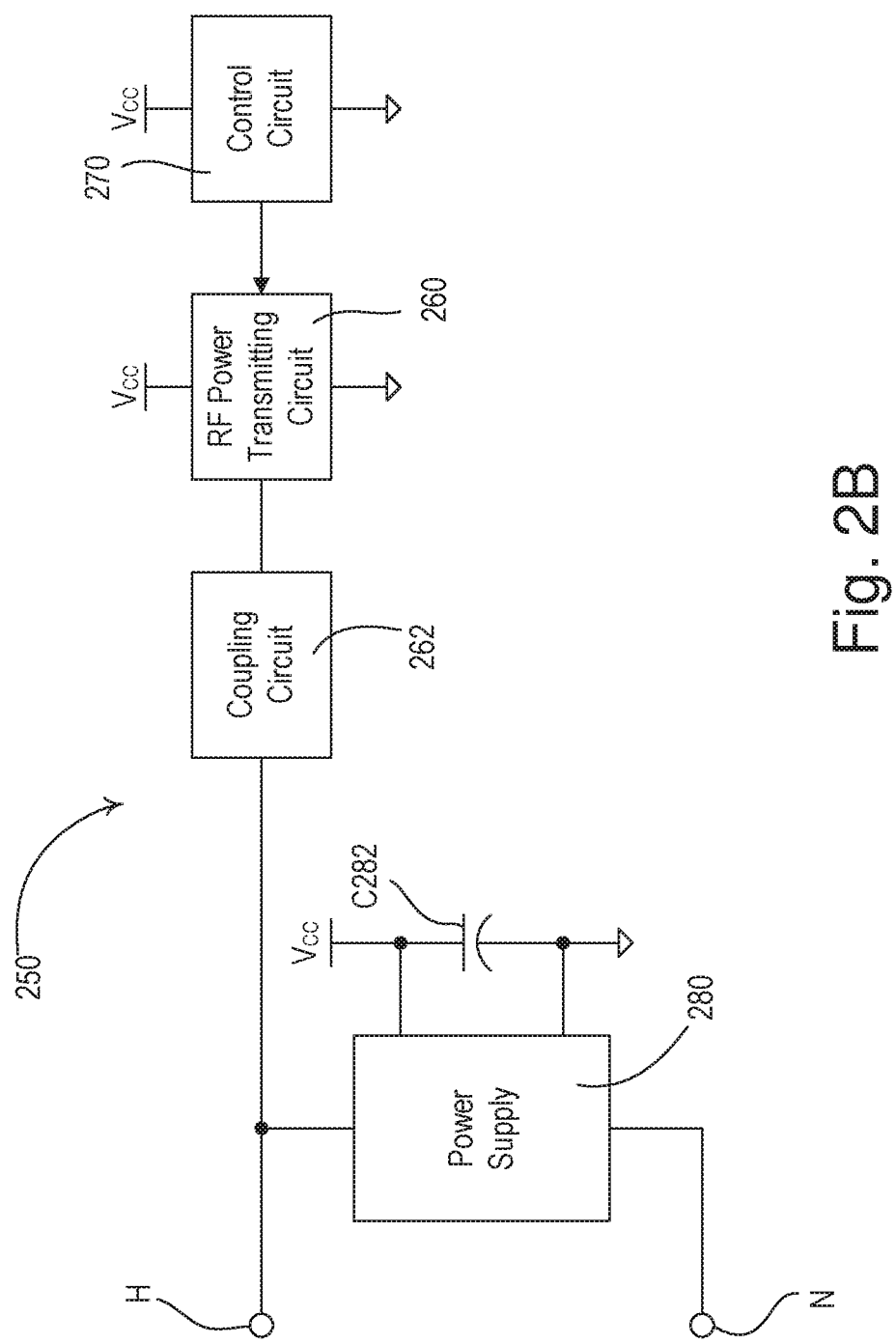

FIG. 2B is a simplified block diagram of an example wireless power transmitting module 250, which may be deployed as, for example, the wireless power transmitting module 190' of the wireless power supply shown in FIG. 1B. The wireless power transmitting module 250 may comprise a wireless power transmitting circuit 260 configured to wirelessly transmit power to, for example, wireless power receiving circuits inside of one or more of the control devices of a load control system (e.g., the control devices of the load control system 100' shown in FIG. 1B). The wireless power transmitting module 250 may comprise a control circuit 270 (e.g., a digital control circuit) for controlling the operation of the wireless power transmitting circuit 260. The control circuit 270 may comprise, for example, a microprocessor, a programmable logic device (PLD), a microcontroller, an application specific integrated circuit (ASIC), a field-programmable gate array (FPGA), or any suitable processing device or control circuit. The wireless power transmitting module 250 may comprise a power supply 280 for generating a DC supply voltage $V_{CC}$ (e.g., having a nominal magnitude of approximately 3.3 V) for powering the wireless power transmitting circuit 260 and the control circuit 270. The DC supply voltage $V_{CC}$ may be generated across a storage capacitor C282. The power supply 280 may be electrically coupled to a hot terminal H and a neutral terminal N to receiver power from an AC power source.

The wireless power transmitting circuit 260 may be coupled (e.g., electrically or magnetically coupled) to the hot terminal H through a coupling circuit 262. For example, the coupling circuit 262 could comprise a capacitor (not shown) coupled between the wireless power transmitting circuit 260 and the hot terminal H. Further, the coupling circuit 262 could comprise a transformer (not shown) for coupling the wireless power transmitting circuit 260 to the hot terminal H.

The control circuit 270 may be configured to control the wireless power transmitting circuit 260 to cause the wireless power transmitting circuit 260, for example, to continuously transmit power to the wireless power receiving circuits of the control devices. Further, the control circuit 270 may be configured to pulse-width modulate the operation of the wireless power transmitting circuit 260 to cause the wireless power transmitting circuit 260 to transmit power in a periodic (e.g., a pulsed or pulse-width modulated) manner, for example, in bursts having a higher peak power for a shorter duration.

Figure 3:
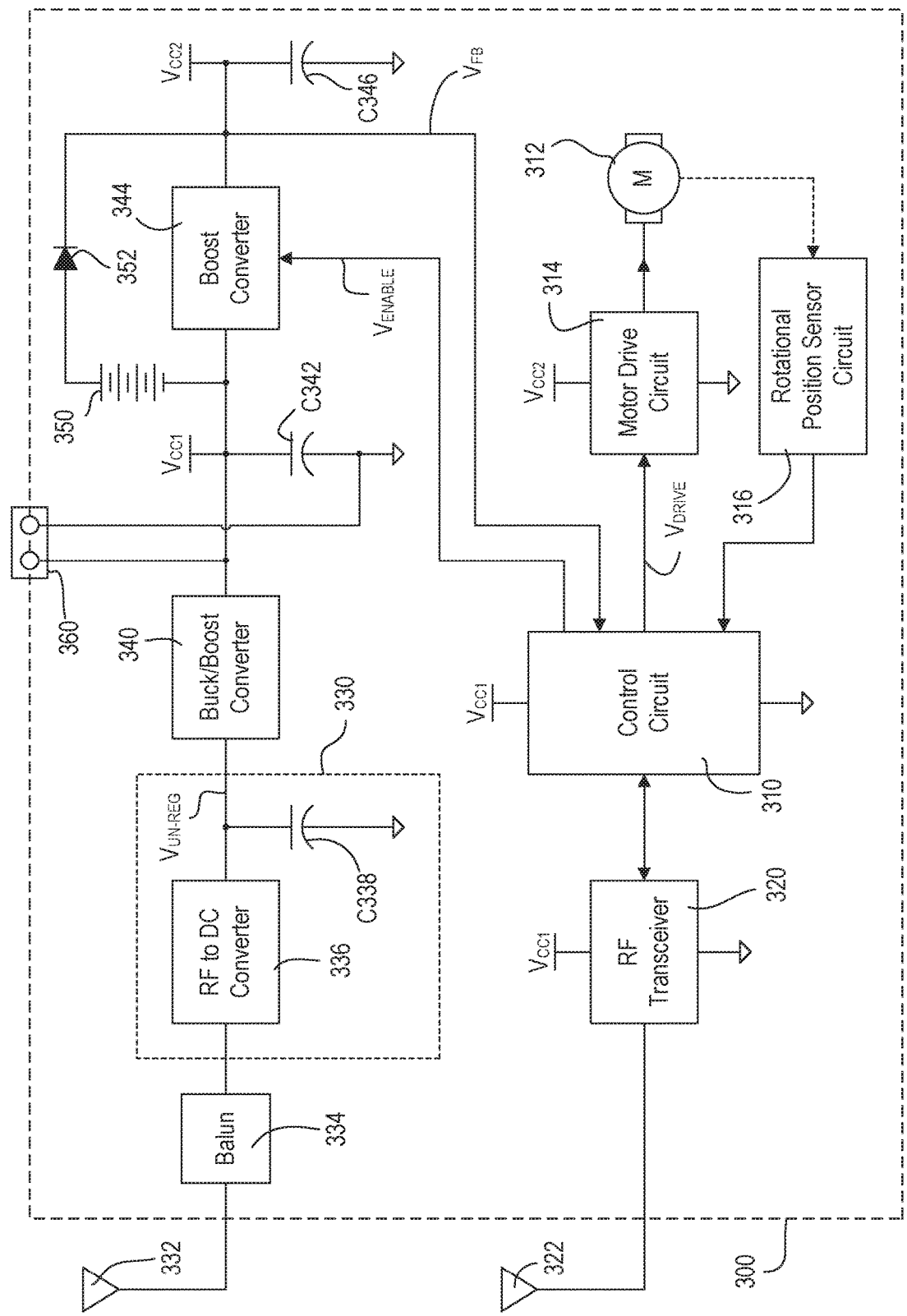
FIG. 3 is a simplified block diagram of an example load control device having a wireless power receiving circuit.

FIG. 3 is a simplified block diagram of an example load control device, e.g., a motor drive unit 300 for a motorized window treatment, which may be deployed as, for example, the motor drive unit 155 of the motorized window treatment 150 shown in FIG. 1A. The motor drive unit 300 may comprise a control circuit 310 (e.g., a digital control circuit) for controlling the operation of an electrical load, e.g., a motor 312. For example, the motor 312 may comprise a DC motor or other suitable motor load. The control circuit 310 may comprise, for example, a microprocessor, a programmable logic device (PLD), a microcontroller, an application specific integrated circuit (ASIC), a field-programmable gate array (FPGA), or any suitable processing device or control circuit. The control circuit 310 may be coupled to a motor drive circuit 314 (e.g., an H-bridge drive circuit) for driving the motor 312 via one or more drive signals $V_{DRIVE}$. The motor drive circuit 314 may control the amount of power delivered to the motor 312 in response to the drive signals $V_{DRIVE}$ to adjust the position of a covering material (e.g., the window treatment fabric 152) between a fully-open position and a fully-closed position.

The control circuit 310 may receive information regarding the rotational position and direction of rotation of the motor 312 from a rotational position sensor circuit 316 (e.g., a transmissive optical sensor circuit). The rotational position sensor circuit 316 may also comprise other suitable position sensors or sensor arrangements, such as, for example, Hall-effect, optical, or resistive sensors. The control circuit 310 may be configured to determine a rotational position of the motor 312 in response to the rotational position sensor circuit 316, and to use the rotational position of the motor to determine a present position of the covering material. The control circuit 310 may comprise an internal non-volatile memory (e.g., and/or an external memory coupled to the control circuit) for storage of operational characteristics of the motor drive unit 200, for example, the present position of the covering material, the fully open position, the fully closed position.

The motor drive unit 300 may comprise a wireless communication circuit, e.g., an RF transceiver 320 coupled to an antenna 322 for transmitting and receiving wireless signals (e.g., the RF signals 108). The control circuit 310 may be coupled to the RF transceiver 320 for receiving digital messages via the RF signals from an input device (e.g., the remote control device 170, the occupancy sensor 172, and/or the daylight sensor 174). The control circuit 310 may be configured to control the motor drive circuit 314 in response to the received digital messages. The control circuit 310 may be configured to transmit digital messages including status information to an external device (e.g., the system controller 110) via the RF signals. Further, the wireless communication circuit may comprise an RF receiver for receiving RF signals, an RF transmitter for transmitting RF signals, an infrared (IR) transmitter and/or receiver for transmitting and/or receiving IR signals, and/or other suitable wireless communication circuit.

The motor drive unit 300 may also comprise a wireless power receiving circuit 330 coupled to an antenna 332, e.g., an electric field (E-field) antenna, through a balun circuit 334. For example, the antenna 332 may comprise a dipole antenna (e.g., having the antenna wires 156A, 156B as shown in FIG. 1A). The wireless power receiving circuit 330 may include an RF-to-DC converter circuit 336 and an energy storage element, such as a storage capacitor C338 (e.g., having a capacitance of approximately 100 g). Alternatively or additionally, the energy storage element may comprise a battery, a super capacitor, an inductor, or other suitable energy storage device. The antenna 332 may capture (e.g., harvest) power from RF signals transmitted by a wireless power transmitting module (e.g., the RF signals 198 transmitted by the wireless power transmitting module 190). For example, the amount of power harvested by the antenna 332 from the RF signals may be approximately 40 mW. The RF-to-DC converter circuit 336 may operate to convert the energy from the RF signals to an un-regulated DC voltage $V_{UN-REG}$ across the storage capacitor C338. The RF-to-DC converter circuit 336 may have, for example, an efficiency of approximately 50%, such that the amount of power able to be delivered by the RF-to-DC converter circuit may be approximately 20 mW.

The motor drive unit 300 may comprise a first regulated power supply, e.g., a buck/boost converter 340, for generating a first regulated DC supply voltage $V_{CC1}$ (e.g., having a nominal magnitude of approximately 3.3 V) from the un-regulated DC voltage $V_{UN-REG}$. The first DC supply voltage $V_{CC1}$ may be generated across a storage capacitor C342, which, for example, may comprise a super-capacitor (or multiple super capacitors in parallel) and may have a capacitance of approximately 50 F. The buck/boost converter 340 may have, for example, an efficiency of approximately 80%, such that the amount of power able to be delivered by the buck/boost converter may be approximately 16 mW. The low-voltage circuitry of the motor drive unit 300 (e.g., including the control circuit 310 and the RF transceiver 320) may be powered by the first DC supply voltage $V_{CC1}$ and may require, for example, approximately 1 mW of power when the control circuit is not controlling the motor drive circuit 314 to drive the motor 312. In some examples, the low-voltage circuitry of the motor drive unit 300 may be powered exclusively by the DC supply voltage $V_{CC1}$.

The motor drive unit 300 may further comprise a second regulated power supply, e.g., a boost converter 344, that may receive the first DC supply voltage $V_{CC1}$ and may generate a second regulated DC supply voltage $V_{CC2}$ (e.g., having a nominal magnitude of approximately 9 V) across a storage capacitor C342 (e.g., having a capacitance of approximately 680 g). The boost converter 344 may have, for example, an efficiency of approximately 80%, such that the amount of power able to be delivered by the boost converter may be approximately 13 mW. The motor drive circuit 314 may receive the second DC supply voltage $V_{CC2}$ for driving the motor 312. For example, the motor drive circuit 314 may be configured to draw a motor current from the second DC supply voltage $V_{CC2}$, where the motor current may have an average magnitude that is greater when the control circuit 310 is rotating the motor 312 to raise the covering material than when the control circuit 310 is rotating the motor 312 to lowering the covering material, For example, the average magnitude of the motor current may be approximately 150 mA when the control circuit 310 is rotating the motor 312 to lower the covering material and approximately 200 mA when the control circuit 310 is rotating the motor 312 to raise the covering material (e.g., for a shade length of approximately 10 feet).

The boost converter 344 may be configured to generate the second DC supply voltage $V_{CC2}$ when needed, for example, in response to a boost control signal $V_{ENABLE}$ generated by the control circuit 310. For example, the control circuit 310 may be configured to enable the boost converter 344 to generate the second DC supply voltage $V_{CC2}$ when the control circuit is controlling the motor drive circuit 314 to drive the motor 312. The control circuit 310 may be configured to disable the boost converter 344 when the second DC supply voltage $V_{CC2}$ is not needed to drive the motor 312. The capacitor C342 (for storing the first DC supply voltage $V_{CC1}$) may be sized such that the magnitude of the first DC supply voltage $V_{CC1}$ only drops approximately one volt when the control circuit 310 is rotating the motor to raise the covering material from the fully-closed position to the fully-open position (e.g., if the covering material has a length of approximately 120 inches). The capacitor C342 may be configured to charge when the control circuit 310 is not controlling the motor drive circuit 312 to drive the motor 312. For example, if the magnitude of the first DC supply voltage $V_{CC1}$ drops approximately one volt while the motor 312 is rotating to raise the covering material, the capacitor C342 may require approximately 2.52 hours to recharge to the nominal magnitude (e.g., approximately 3.3 V).

The motor drive unit 300 may further comprise a battery 350 coupled in series with a diode D352 between the first DC supply voltage $V_{CC1}$ and the second DC supply voltage $V_{CC2}$. While one battery is shown in FIG. 2A, the battery 350 may comprise multiple batteries coupled in parallel and/or in series. The control circuit 310 may be configured to receive a feedback signal $V_{FB}$ that indicates the magnitude of the second DC supply voltage $V_{CC2}$. If the magnitude of the second DC supply voltage $V_{CC2}$ drops below a predetermined threshold (e.g., below a level that is too low to appropriately drive the motor 312), the control circuit 310 may disable the boost converter 344, such that the motor drive circuit 314 is able to draw current from the battery 350 through the diode D352 to drive the motor. For example, the control circuit 310 may only need to disable the boost converter 344 while driving the motor 312 when the covering material is being moved rapidly in a short period of time. During normal operation of the motor drive unit 300, the motor drive circuit 314 may not draw current from the battery 350 thus extending the lifetime of the battery.

Since the capacitor C342 for storing the first DC supply voltage $V_{CC1}$ has a large capacitance, the capacitor C342 may take a long time to charge when the motor drive unit 150 is first powered up. Accordingly, the motor drive unit 300 may further comprise a quick-charge connector 360 electrically coupled to the capacitor C342 to quickly charge the capacitor C342 from an external power supply to allow for the initial setup and operation of the motor drive unit 300.

It should be appreciated that other load control devices of the load control system 100 (e.g., the LED driver 130, the plug-in load control device 140, a controllable electrical receptacle, a thermostat, an audio system, etc.) may include a wireless power receiving circuit and have a similar structure as the motor drive unit 300 shown in FIG. 3. For example, the load control device may include all the components of the load control device 300 except for the motor 312, the motor drive circuit 314, and/or the rotational position sensor circuit 316, and for example, may include one or more other components specific to load control device (e.g., specific for controlling the electrical load controlled by the load control device). For example, low-voltage circuitry of the load control device may be powered (e.g., exclusively) by the first DC supply voltage $V_{CC1}$, and higher-voltage circuitry of the load control device may be powered by the second DC supply voltage $V_{CC2}$.

Figure 4:
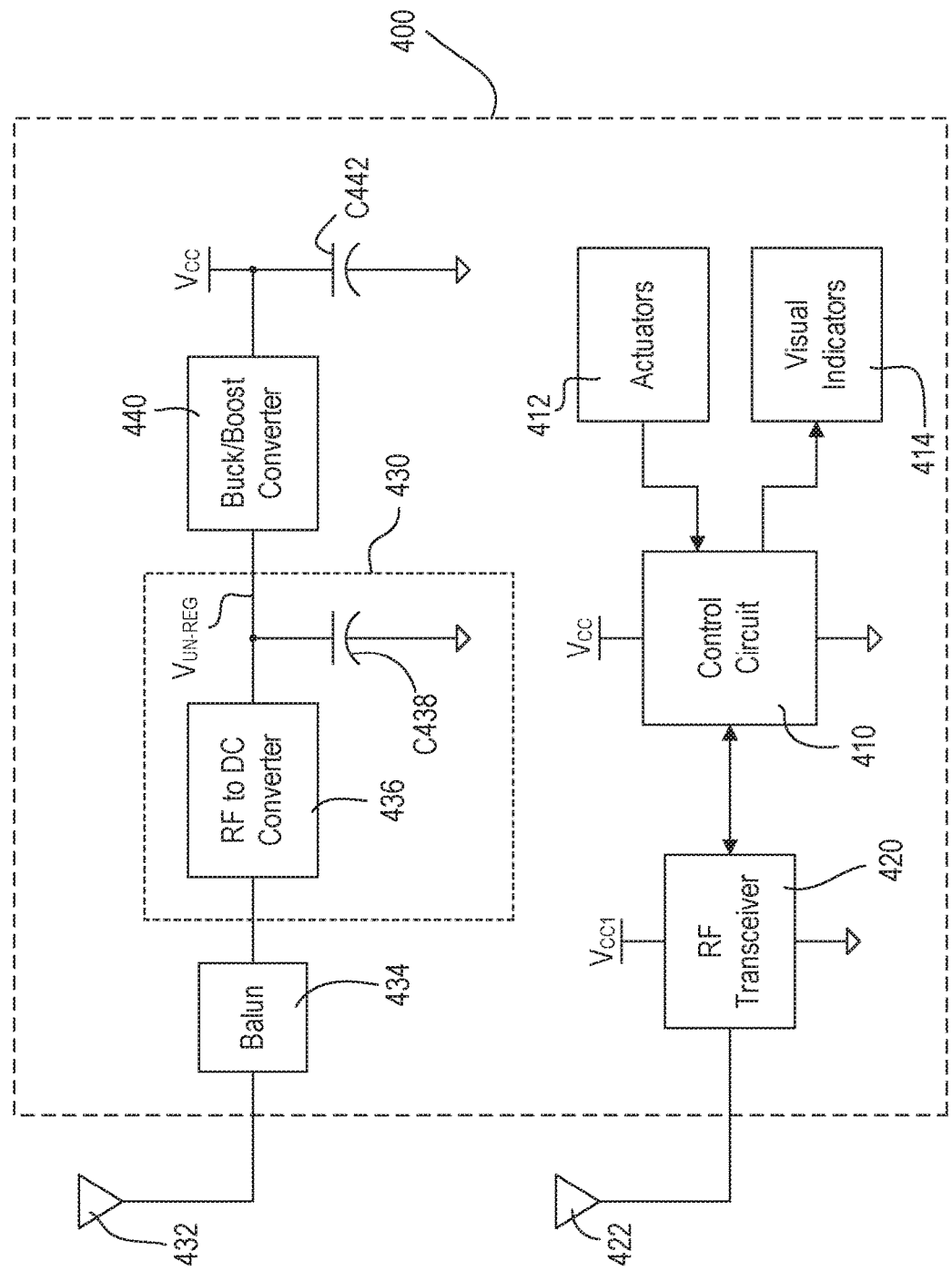
FIG. 4 is a simplified block diagram of another example control device having a wireless power receiving circuit.

FIG. 4 is a simplified block diagram of an example control device, e.g., a remote control device 400, which may be deployed as, for example, the remote control device 170 of the load control system 100 shown in FIG. 1A. The remote control device 400 may comprise a control circuit 410, which may include one or more of a processor (e.g., a microprocessor), a microcontroller, a programmable logic device (PLD), a field programmable gate array (FPGA), an application specific integrated circuit (ASIC), or any suitable processing device. The remote control device 400 may comprise one or more control actuators 412 for receiving user inputs (e.g., for controlling an electrical load), and one or more visual indicators 414 for providing feedback to a user of the remote control device 400. The control circuit 410 may comprise an internal non-volatile memory (e.g., and/or an external memory coupled to the control circuit) for storage of operational characteristics of the remote control device 400, such as, a unique identifier (e.g., a serial number) of the remote control device.

The remote control device 400 may comprise a wireless communication circuit, e.g., an RF transceiver 420 coupled to an antenna 422 for transmitting wireless signals (e.g., the RF signals 108). The control circuit 410 may be coupled to the RF transceiver 420 for transmitting digital messages via the RF signals in response to the actuations of the control actuators 412. The digital messages transmitted by the remote control device 400 may include a command and identifying information, for example, the serial number that is stored in the memory. The remote control device 400 may be configured to transmit digital messages via the RF signals according to a predefined RF communication protocol, such as, for example, one of LUTRON CLEAR CONNECT, WIFI, BLUETOOTH, ZIGBEE, Z-WAVE, KNX-RF, and ENOCEAN RADIO protocols. Alternatively, the wireless communication circuit may comprise an RF receiver for receiving RF signals, an RF transmitter for transmitting RF signals, an infrared (IR) transmitter and/or receiver for transmitting and/or receiving IR signals, or other suitable wireless communication circuit.

The remote control device 400 may also comprise a wireless power receiving circuit 430 coupled to an antenna 432 through a balun circuit 434. The wireless power receiving circuit 430 may include an RF-to-DC converter circuit 436 and a storage capacitor C438 (e.g., having a capacitance of approximately 100 μF). The antenna 432 may capture (e.g., harvest) power from RF signals transmitted by a wireless power transmitting module (e.g., the RF signals 198 transmitted by the wireless power transmitting module 190). For example, the amount of power harvested by the antenna 432 from the RF signals may be approximately 40 mW. The RF-to-DC converter circuit 436 may operate to convert the energy from the RF signals to an un-regulated DC voltage $V_{UN-REG}$ across the storage capacitor C438. The RF-to-DC converter circuit 436 may have, for example, an efficiency of approximately 50%, such that the amount of power able to be delivered by the RF-to-DC converter circuit may be approximately 20 mW.

The remote control device 400 may comprise a regulated power supply, e.g., a buck/boost converter 440, for generating a regulated DC supply voltage $V_{CC}$ (e.g., having a nominal magnitude of approximately 3.3 V) from the un-regulated DC voltage $V_{UN-REG}$. The DC supply voltage $V_{CC}$ may be generated across a storage capacitor C442. The control circuit 410, the RF transceiver 420, and/or other circuitry of the remote control 400 may be powered by the DC supply voltage $V_{CC}$. For example, the circuitry (e.g., the low-voltage circuitry) of the remote control 400 may be powered exclusively by the DC supply voltage $V_{CC}$. The remote control device 400 may also comprise a battery (not shown) for supplying power to the control circuit 410, the RF transceiver 420, and/or other circuitry of the remote control 400, for example, if the RF-to-DC converter circuit 436 is unable to supply the appropriate power. The remote control device 400 may further comprise a quick-charge connector (not shown) electrically coupled to the capacitor C442 to quickly charge the capacitor C442 from an external power supply to allow for the initial setup and operation of the remote control device 400.

Other control devices of the load control system 100 (e.g., the occupancy sensor 172, the daylight sensor 174, and/or the beacon transmitting device 184) may have a similar structure as the remote control device 400 shown in FIG. 4. For example, the occupancy sensor 172, the daylight sensor 174, and/or the beacon transmitting device 184 may each comprise an RF-to-DC converter circuit similar to the RF-to-DC converter circuit 436 of the remote control device 400 shown in FIG. 4. In addition, the occupancy sensor 172 may comprise an internal occupancy sensing circuit powered by the DC supply voltage $V_{CC}$. The daylight sensor 174 may comprise an internal daylight sensing circuit powered by the DC supply voltage $V_{CC}$. The beacon transmitting device 184 may comprise an internal beacon transmitting circuit powered by the DC supply voltage $V_{CC}$.

Figure 5:
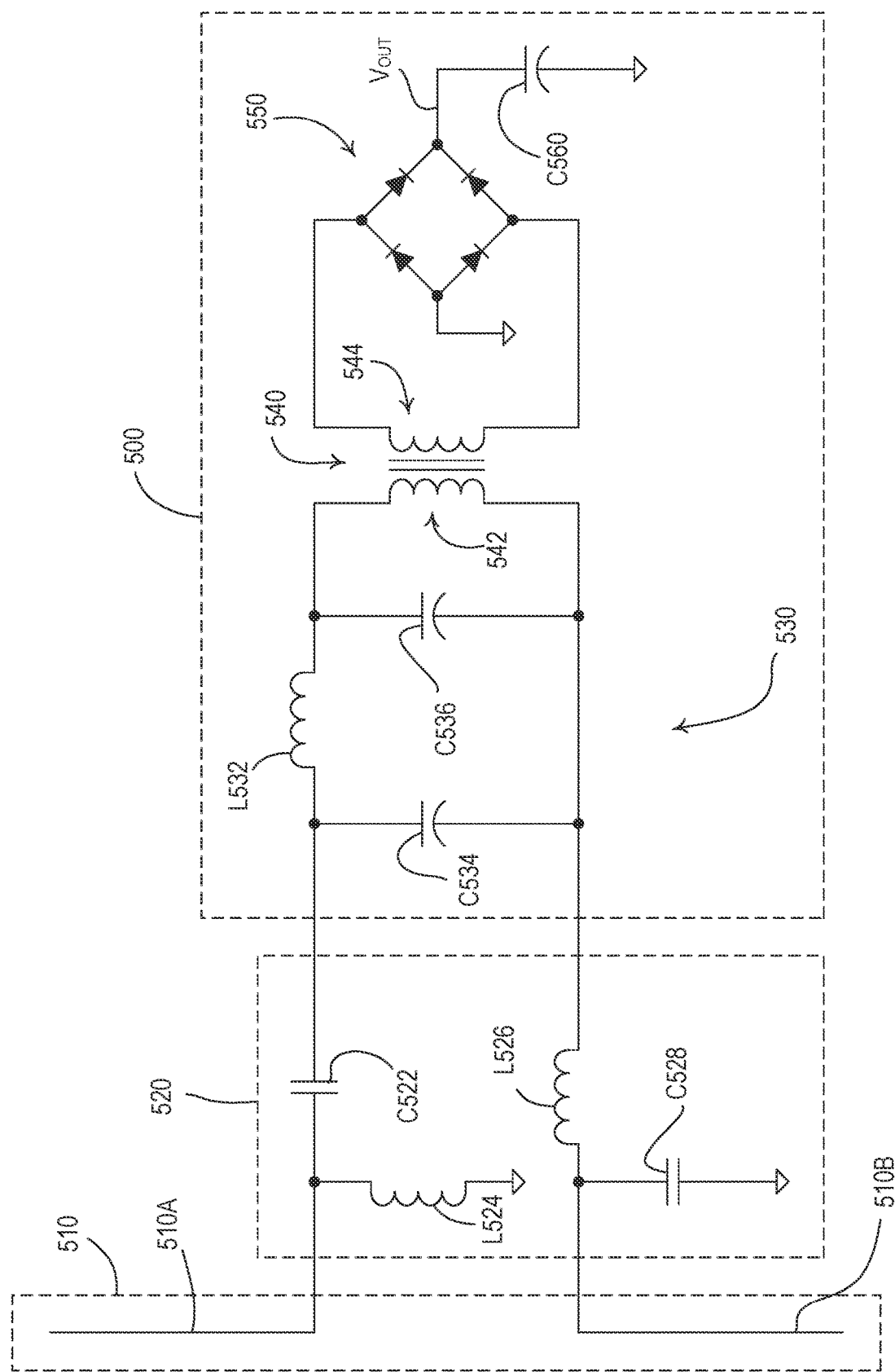
FIG. 5 is a simplified schematic diagram of a portion of a wireless power receiving circuit illustrating a first example of an RF-to-DC converter circuit.

FIG. 5 is a simplified schematic diagram of an example RF-to-DC converter circuit 500, which may be an example of the RF-to-DC converter circuit 336 of the motor drive unit 300 shown in FIG. 3 and/or the RF-to-DC converter circuit 436 of the remote control device 400 shown in FIG. 4. The RF-to-DC converter circuit 500 may be coupled to an antenna 510 (e.g., the antenna 332 shown in FIG. 3 and/or the antenna 432 shown in FIG. 4) for harvesting power from RF signals transmitted by a wireless power transmitting module (e.g., the RF signals 198 transmitted by the wireless power transmitting module 190). The RF-to-DC converter circuit 500 may operate to convert the energy from the RF signals (e.g., transmitted in the AM radio band in the RF frequency range of approximately 580-1700 kHz) received by the antenna 510 to an output voltage $V_{OUT}$ (e.g., un-regulated DC voltage) generated across a storage capacitor C560.

The antenna 510 may comprise two antenna wires 510A, 510B (e.g., the antenna wires 156A, 156B of the motor drive units 155 shown in FIG. 1A), for example, that form a dipole antenna. The antenna 510 may be coupled to the RF-to-DC converter circuit 500 through balun circuit 520. The balun circuit 520 may comprise a first LC circuit (e.g., having a capacitor C522 and an inductor L524) electrically coupled between the first antenna wire 510A and the RF-to-DC converter circuit 500. The balun circuit 520 may comprise a second LC circuit (e.g., having an inductor L526 and a capacitor C528) electrically coupled between the second antenna wire 510B and the RF-to-DC converter circuit 500.

The RF-to-DC converter circuit 500 may comprise a matching network 530 (e.g., a π-network) having an inductor L532 and two capacitors C534, C536. The matching network 530 may ensure maximum power transfer from the antenna 510 to the rest of the circuitry of the RF-to-DC converter circuit 500. The RF-to-DC converter circuit 500 may also comprise a transformer 540 (e.g., a step-up transformer) having a primary winding 542 coupled to the matching network 530 and a secondary winding 544 coupled to AC terminals of a rectifier circuit 550 (e.g., a full-wave bridge rectifier). The transformer 540 may have a turn ratio of, for example, 1:N, such that the magnitude of a secondary voltage across the secondary winding 544 is greater than a magnitude of a primary voltage across the primary winding 542. The rectifier circuit 550 may have DC terminals coupled across the storage capacitor C560 for generating the output voltage $V_{OUT}$ across the storage capacitor. The increase in the magnitude of the voltage provided by the transformer 540 may ensure that the losses through the rectifier circuit 550 (e.g., due to the forward drop of the diodes of the bridge rectifier) are minimal.

Figure 6:
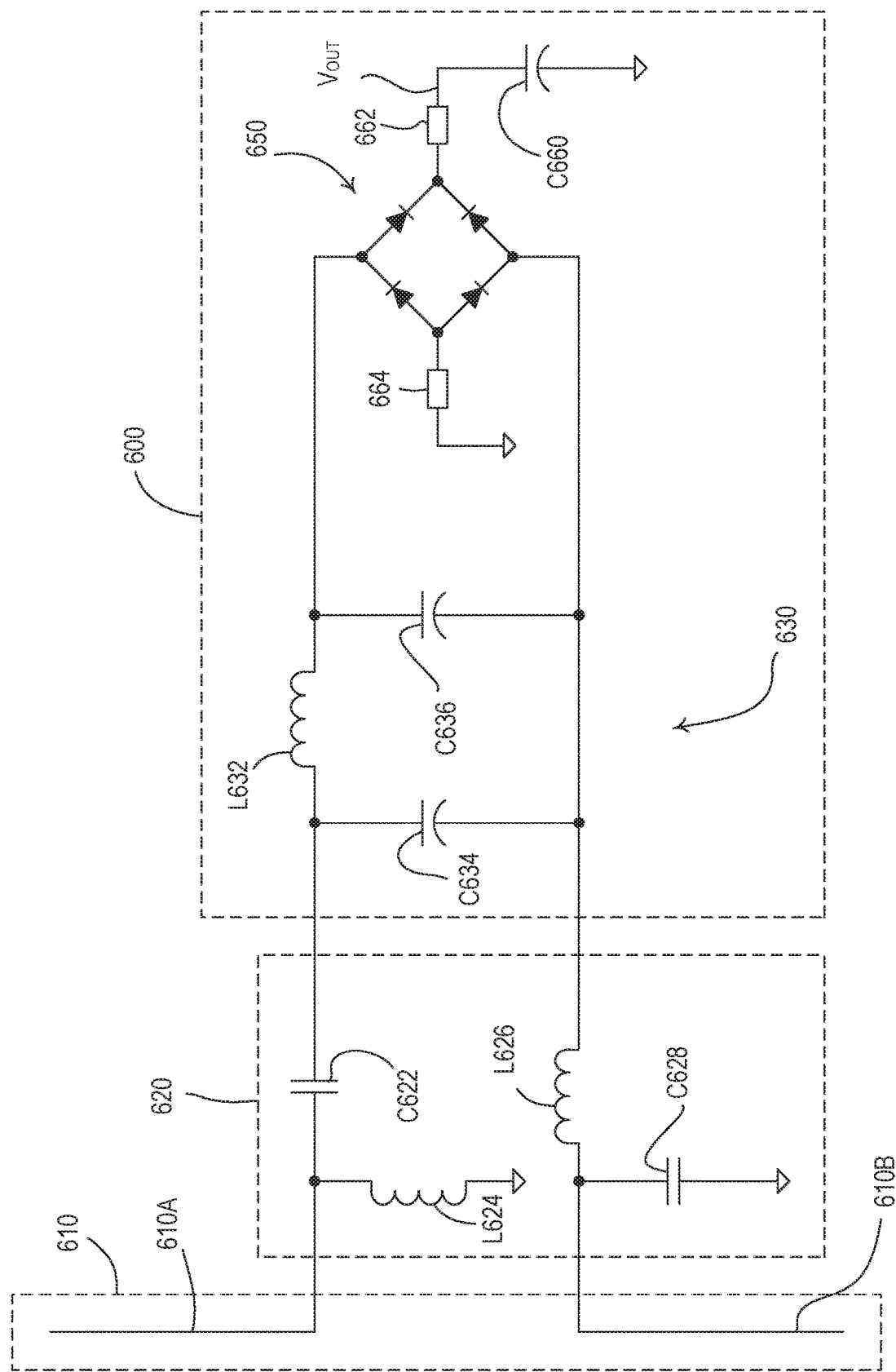
FIG. 6 is a simplified schematic diagram of a portion of a wireless power receiving circuit illustrating a second example of an RF-to-DC converter circuit.

FIG. 6 is a simplified schematic diagram of another example RF-to-DC converter circuit 600, which may also be an example of the RF-to-DC converter circuit 336 of the motor drive unit 300 shown in FIG. 3 and/or the RF-to-DC converter circuit 436 of the remote control device 400 shown in FIG. 4. The RF-to-DC converter circuit 600 may be coupled to an antenna 610 (e.g., the antenna 332 shown in FIG. 3 and/or the antenna 432 shown in FIG. 4) for harvesting power from RF signals transmitted by a wireless power transmitting module (e.g., the RF signals 198 transmitted by the wireless power transmitting module 190). The RF-to-DC converter circuit 600 may operate to convert the energy from the RF signals (e.g., transmitted at 2.4 GHz) received by the antenna 610 to an output voltage $V_{OUT}$ (e.g., un-regulated DC voltage) generated across a storage capacitor C660.

The antenna 610 may comprise two antenna wires 610A, 610B (e.g., the antenna wires 156A, 156B of the motor drive units 155 shown in FIG. 1A), for example, that forms a dipole antenna. The antenna 610 may be coupled to the RF-to-DC converter circuit 600 through balun circuit 620. The balun circuit 620 may comprise a first LC circuit (e.g., having a capacitor C622 and an inductor L624) electrically coupled between the first antenna wire 610A and the RF-to-DC converter circuit 600. The balun circuit 620 may comprise a second LC circuit (e.g., having an inductor L626 and a capacitor C628) electrically coupled between the second antenna wire 610B and the RF-to-DC converter circuit 600.

The RF-to-DC converter circuit 600 may comprise a matching network 630 (e.g., a π-network) having an inductor L632 and two capacitors C634, C636. The matching network 630 may ensure maximum power transfer from the antenna 610 to the rest of the circuitry of the RF-to-DC converter circuit 600. The matching network 630 may be coupled to AC terminals of a rectifier circuit 650 (e.g., a full-wave bridge rectifier). The rectifier circuit 650 may have DC terminals coupled across the storage capacitor C660 for generating the output voltage $V_{OUT}$ across the storage capacitor. In addition, the DC terminals of the rectifier circuit 650 may be coupled to the storage capacitor C660 and circuit common through respective ferrite beads 662, 664. The ferrite beads 662, 664 may operates to ensure that the storage capacitor C660 does not appear as a short circuit at the frequency of the RF signals (e.g., at 2.4 GHz).

What is claimed is:

1. A wireless power supply system comprising:
  wireless power transmission circuitry couplable to an alternating current (AC) source, the wireless power transmission circuit to wirelessly transmit power via a radio frequency (RF) power transmission signal;
  wireless power reception circuitry that includes:
    a first antenna to receive the RF power transmission signal;
    power receiving circuitry to convert the received RF signal to provide a power signal at a direct current (DC) voltage, the power receiving circuitry including:
      RF to DC converter circuitry; and
      a first energy storage device conductively coupled to the RF to DC converter circuitry;
    buck/boost converter circuitry operatively coupled to the power receiving circuitry, the buck/boost converter circuitry to convert the power signal received from the power receiving circuitry to a first DC output voltage;
    boost converter circuitry to convert the first DC output voltage to a second DC output voltage, the second DC output voltage greater than the first DC output voltage;
    a second energy storage device operatively coupled to the boost converter circuitry, the second energy storage device to store at least a portion of the power output provided by the boost converter circuitry; and
    a drive circuit to provide power at the second DC output voltage to an electrical load device external to the wireless power reception circuitry;
    a second antenna to receive an RF control data signal;
    control circuitry operatively coupled to the second antenna and the drive circuit, the control circuitry to:
      measure the second DC output voltage supplied by the boost converter circuitry to the electrical load device;
      determine if the measured second DC output voltage is at or above a predetermined threshold voltage; and
      cause the boost converter circuitry to provide power at the second DC output voltage from the boost converter circuitry to the electrical load device responsive to a determination that the second DC output voltage provided by the boost converter circuitry is at or above the predetermined threshold voltage.

2. The wireless power supply system of claim 1, the control circuitry to further:
  disable the boost converter circuitry responsive to a determination that the second DC output voltage provided by the boost converter circuitry is below the predetermined threshold voltage; and
  cause a battery to provide power at the second DC output voltage to the electrical load device.

3. The wireless power supply system of claim 1:
wherein the RF power transmission signal includes an RF power transmission signal at a first frequency; and
wherein the RF control data signal include an RF control data signal at a second frequency, the second frequency different than the first frequency.

4. The wireless power supply system of claim 1 wherein the first energy storage device comprises one or more super capacitors.

5. The wireless power supply system of claim 1 wherein the RF power transmission signal comprises an RF power transmission signal at a frequency within an amplitude modulation (AM) radio band from approximately 580 kHz to 1700 kHz.

6. The wireless power supply system of claim 1 wherein the RF power transmission signal comprises an RF power transmission signal at a frequency of 2.4 GHz and the first antenna comprises an antenna array.

7. The wireless power transmission system of claim 1 wherein the RF power transmission signal comprises a pulse-width modulated RF power transmission signal.

8. The wireless power transmission system of claim 7 wherein the pulse-width modulated RF power transmission signal sweeps across a plurality of frequencies.

9. The wireless power transmission system of claim 1 wherein the electrical load device comprises an electric motor operatively coupled to a widow treatment.

10. A wireless power transmission method, comprising:
receiving, by wireless power reception circuitry via a first antenna, a radio frequency (RF) signal;
converting, by RF to direct current (DC) converter circuitry, the received RF signal to a power signal having a DC voltage;
storing at least a portion of the power included in the power signal in an energy storage device conductively coupled to the RF to DC converter circuitry;
converting, by buck/boost converter circuitry, a remaining portion of the power signal to a first DC output voltage;
providing at least a portion of the first DC output voltage to control circuitry;
measuring, by the control circuitry, a second DC output voltage provided by boost converter circuitry using the first DC output voltage, at least a portion of the second DC output voltage supplied to an operatively coupled electrical load device;
providing, by the control circuitry, power at the second DC output voltage from the boost converter circuitry to a second energy storage device;
determining, by the control circuitry, if the measured second DC output voltage is at or above a predetermined threshold voltage; and
responsive to the determination, by the control circuitry, that the second DC output voltage provided by the boost converter circuitry is at or above the predetermined threshold voltage:
causing, by the control circuitry, the boost converter circuitry to provide power at the second DC output voltage to the electrical load device.

11. The wireless power transmission method of claim 10, further comprising:
responsive to a determination, by the control circuitry, that the second DC output voltage provided by the boost converter circuitry is below the predetermined threshold voltage:
disabling, by the control circuitry, the boost converter circuitry; and
causing, by the wireless control circuitry, a battery to provide power at the second DC output voltage to the electrical load device.

12. The wireless power transmission method of claim 10, further comprising:
receiving, by the control circuitry via a second antenna, an RF control data signal; and
adjusting, by the control circuitry, an operation of the electrical load device responsive to receipt of the RF control data signal.

13. The wireless power transmission method of claim 10 wherein receiving the first DC output voltage from the RF power transmission signal via the RF to DC converter circuitry further comprises:
receiving, by the wireless power reception circuitry, the first DC output voltage from a pulse-width modulated RF power transmission signal via the RF to DC converter circuitry.

14. The wireless power transmission method of claim 13 wherein receiving the first DC output voltage from the pulse-width modulated radio frequency (RF) power transmission signal via the RF to DC converter circuitry further comprises:
receiving the first DC output voltage from the pulse-width modulated RF power transmission signal that sweeps across a plurality of frequencies.

15. The wireless power transmission method of claim 10 wherein selectively providing power at the second DC output voltage from the boost converter circuitry to the energy storage device further comprises:
providing, by the control circuitry, power at the second DC output voltage from the boost converter circuitry to one or more super capacitors.

16. A non-transitory, machine-readable, storage device that includes instructions that, when executed by wireless power reception circuitry, causes the wireless power reception circuitry to:
receive, via a first antenna, a radio frequency (RF) signal;
convert, by RF to direct current (DC) converter circuitry, the received RF signal to a power signal having a DC voltage;
store, in an energy storage device conductively coupled to the RF to DC converter circuitry, at least a portion of the power included in the power signal;
converting, by buck/boost converter circuitry, a remaining portion of the power included in the power signal to a first DC output voltage;
provide at least a portion of the first DC output voltage to control circuitry;
provide at least a portion of the first DC output voltage to boost converter circuitry;
measure a second DC output voltage provided by the boost converter circuitry, at least a portion of the second DC output voltage supplied to an operatively coupled electrical load device;
provide power at the second DC output voltage from the boost converter circuitry to a second energy storage device;
determine if the measured second DC output voltage is at or above a predetermined threshold voltage; and
responsive to a determination that the second DC output voltage is at or above the predetermined threshold voltage:
interrupt the provision of power from the boost converter circuitry to the energy storage device; and cause the boost converter circuitry to provide power to the electrical load device at the second DC output voltage.

17. The non-transitory, machine-readable, storage device of claim 16 wherein the instructions further cause the wireless power reception circuitry to:
responsive to a determination that the second DC output voltage provided by the boost converter circuitry is below the predetermined threshold voltage:
disable the boost converter circuitry; and
cause a battery to provide power at the second DC output voltage to the electrical load device.

18. The non-transitory, machine-readable, storage device of claim 16 wherein the instructions further cause the wireless power reception circuitry to:
receive, via a second antenna, an RF control data signal; and
adjust an operation of the electrical load device responsive to receipt of the RF control data signal.

19. The non-transitory, machine-readable, storage device of claim 16 wherein the instructions that cause the wireless power reception circuitry to receive the first DC output voltage from the RF power transmission signal via the RF to DC converter circuitry further cause the wireless power reception circuitry to:
receive the first DC output voltage from a pulse-width modulated RF power transmission signal via the RF to DC converter circuitry.

20. The non-transitory, machine-readable, storage device of claim 19 wherein the instructions that cause the wireless power reception circuitry to receive the first DC output voltage from the pulse-width modulated radio frequency (RF) power transmission signal via the RF to DC converter circuitry further cause the wireless power reception circuitry to:
receive the first DC output voltage from a pulse-width modulated RF power transmission signal that sweeps across a plurality of frequencies.

21. The non-transitory, machine-readable, storage device of claim 16 wherein the instructions that cause the wireless power reception circuitry to provide power at the second DC output voltage from the boost converter circuitry to the energy storage device further cause the wireless power reception circuitry to:
provide power at the second DC output voltage from the boost converter circuitry to one or more super capacitors.

* * * * *